INVENTORS.
Ivan M. Thompson
BY John Maskal

ATTORNEY

United States Patent Office 3,451,774
Patented June 24, 1969

3,451,774
METHOD OF PREPARING MAGNESIUM HYDROXIDE
Ivan M. Thompson and John Maskal, Ludington, Mich., assignors to The Dow Chemical Company, Midland, Mich., a corporation of Delaware
Filed June 1, 1966, Ser. No. 554,480
Int. Cl. C01d 5/14
U.S. Cl. 23—201      3 Claims

ABSTRACT OF THE DISCLOSURE

An improved method of preparing magnesium hydroxide formed from dolomitic stone and magnesium chloride-containing brine which comprises continued contacting of the precipitated product with the calcium chloride-containing mother liquor so as to slake the remaining magnesium oxide from the dolomitic stone to magnesium hydroxide. The present method produces a pumpable magnesium hydroxide slurry having a high solids content. The dried magnesium hydroxide product is characterized by unusually high surface area and periclase density.

---

Figure 1:
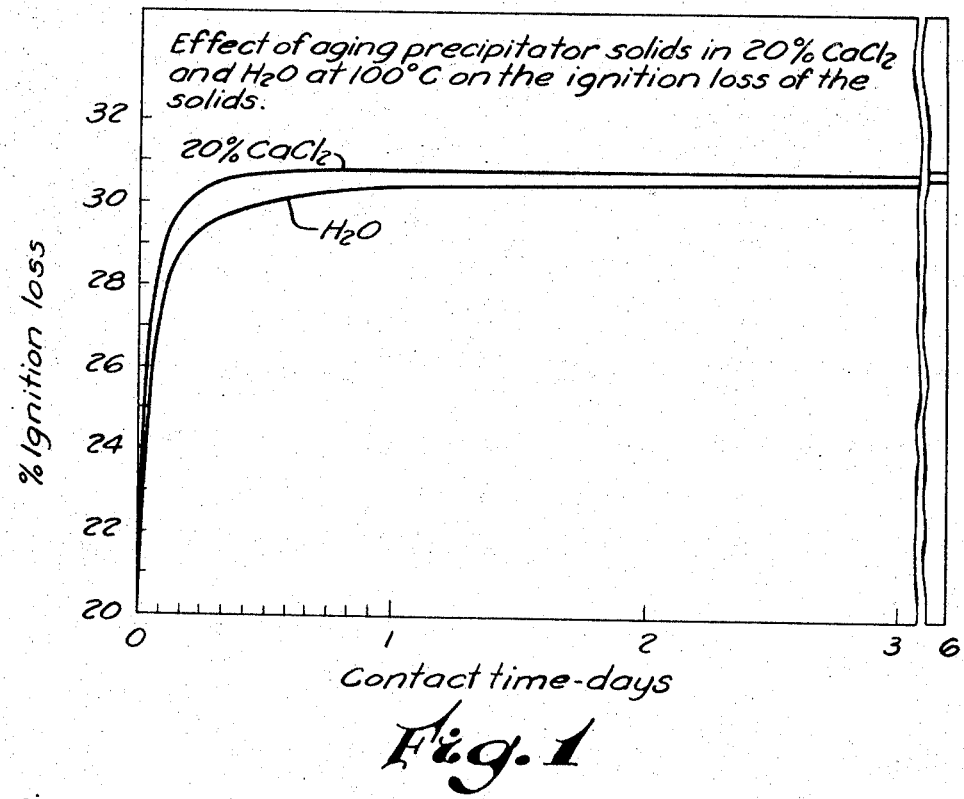

This invention relates to a new and novel method of preparing magnesium hydroxide from dolomitic stone and brines, and more particularly relates to an improved method of preparing dewaterable, pumpable and repulpable magnesium hydroxide slurries which upon drying have a higher than ordinary surface area and which, upon calcining, provide a magnesium oxide product having a high apparent density.

In one conventional method of preparing periclase grade magnesium hydroxide slurries from dolomite and from magnesium chloride-containing brines, e.g., as taught in U.S. Patent 3,080,215, dolomite (a substantially equimolar mixture of calcium carbonate and magnesium carbonate) is first crushed to small calcinable pieces then calcined at, e.g., about 1300° C. to the corresponding oxides by driving off carbon dioxide. This calcined dolomite is referred to hereinafter as "dolime." So-calcined, the calcium oxide portion of the dolime is slaked, i.e., reacted with, e.g., a 9 percent to 15 percent aqueous calcium chloride-containing solution to convert said calcium oxide to the hydroxide. The slaked dolime is used as a precipitant later in the process. Such slaking may be carried out, for example, at a temperature of from about 70° C. to about 100° C. for a time approximately from about 1 to about 30 minutes. Though some slaking of the magnesium oxide in the dolime takes place at the time of the CaO slaking, substantially most of the MgO remains as such. This is subsequently slaked or hydrated during the course of traversing the various steps of the process (one of which is a specific MgO slaking or hydrating step). The slaked dolime is next reacted with the aforesaid magnesium chloride-containing brine to precipitate said magnesium chloride as a slurry of magnesium hydroxide in an aqueous calcium chloride mother liquor. The calcium chloride in the mother liquor derives primarily from the initial concentration thereof in the brine and also as a reaction by-product of the calcium hydroxide precipitant and magnesium chloride. So precipitated, the solids comprising magnesium hydroxide (and unconverted magnesium oxide) are separated from the mother liquor of the precipitator slurry as by filtration. The mother liquor is normally discarded after said separation, or used to recover the $CaCl_2$ therefrom, since it is no longer useful in the process. Washing and filtering of the magnesium hydroxide and the remaining magnesium oxide solids with water follows in order to remove the chloride and other soluble impurities therefrom. These solids are then held in a holding tank wherein steam is sparged therethrough to hydrate the MgO to $Mg(OH)_2$. Upon again refiltering and reslurrying, the solids are "creamed" or "repulped" in agitated tanks to homogenize or break up the filter cake and agglomerates therein to a uniform slurry consistency. The total magnesium hydroxide values (i.e., those obtained by precipitation from the brine and those obtained from the conventional subsequent slaking of the MgO) are ready for production into periclase or to some other magnesium hydroxide or oxide product.

The magnesium hydroxide slurries obtained from these prior art methods cannot, even with repetitive filtering and repulping operations, normally be dewatered or concentrated to a pumpable percent solids exceeding about 59 to 60 percent. Moreover, the periclase produced therefrom upon calcining exhibits a significant density obtainable in accordance with the present invention.

These latter factors are important since there has been a continuing demand in recent years by periclase refractory manufacturers, for a supply of dewaterable and repulpabe magnesium hydroxide slurries of such a solids content and character as will enable more economical shipment, and a magnesium hydroxide from which a higher resulting periclase density can be obtained than has heretofore been available.

A principal object of the present invention, therefore, is to provide a new and improved method of preparing a magnesium hydroxide slurry, having a higher solids content than realized with conventional processes practiced heretofore and from which a higher density periclase product can be derived than heretofore available from a dolomitic-brine process.

The appended drawing shows surface area values and ignition loss values of precipitator solids treated in accordance with one embodiment of the present invention in connection with Example IV hereinafter.

In general, in a process as described above, the novel improvement of the present invention comprises: treating precipitator solids, namely magnesium oxide values, in the presence of an aqueous calcium chloride mother liquor of the precipitator slurry, but outside the precipitator tank, for a duration of time and at a temperature sufficient to convert substantially all the magnesium oxide values to the corresponding hydroxide. It is essential that this treatment of the MgO according to the present novel process be accomplished in the presence of said calcium chloride-containing mother liquor, but at a point in the process other than during the precipitation of the magnesium values in the aforesaid brine, that is other than in the precipitator tank.

Treatment of the MgO in accordance with the present invention may be carried out, for example, in a suitable reactor subsequent to the precipitation step (i.e., subsequent to precipitation of the magnesium values in the brine), but prior to separation of any solids from the mother liquor. An operable treatment temperature is within the range of from about 25° C. to about 100° C., and preferably from about 45° C. to about 80° C. The range of time required to accomplish this treatment varies from about 4 to 8 hours, up to from about 2 to about 5 days, depending on an inverse relationship basis to the temperature being employed. For example, at 100° C. the MgO treatment may require from 4 to 8 hours, while at 25° C. it may require from 3 to 5 days. A particularly preferred temperature and time of operation, at 60°–65° C., is from about 12 to 25 hours. Further, it is necessary that the MgO treatment be accomplished in a calcium chloride aqueous medium containing at least about 1 percent calcium chloride and up to about 30 percent, but preferably from about a 10 to 30 percent calcium chloride concentration.

This calcium chloride treatment aids in obtaining a higher surface area of the magnesium hydroxide and upon calcination produces a higher density MgO. Moreover, a final pumpable slurry is provided having a higher solids percent than realized heretofore.

It is manifest that various combinations of calcium chloride concentration, temperature, and treatment time of the MgO, may be predetermined within the disclosed range as best suited for and employed in actually carrying out the improved process of the present invention with a given slurry in order to prepare the improved magnesium hydroxide described hereinbefore.

The present improvement in magnesium hydroxide processing can be employed with any slurry resulting from any of a variety of dolomite or brine precipitations. The present invention particularly is suitable for use with slurries produced in accordance with the teaching of U.S. 3,080,215, described hereinbefore to recover a dewaterable and high surface area magnesium hydroxide product therefrom. The present invention, however, is not to be construed as being limited to reactant sources from said processes.

The following examples serve to further illustrate the operation and utility of the present invention, but are not to be construed in any way as limiting the invention thereto.

EXAMPLE I

A large initial sample of conventionally prepared precipitator slurry was obtained, containing magnesium hydroxide, unslaked MgO, about 20 percent by weight calcium chloride, and water. The precipitator slurry had been prepared by first crushing Cedarville dolomite stone to calcinable pieces and calcining same at about 1350° C. to dolime, then slaking the dolime at about 81° C. in a 10 percent aqueous calcium chloride slaking liquid. So slaked, the dolime was reacted with a brine assaying by weight as follows:

| | Percent |
|---|---|
| $CaCl_2$ | 17.4 |
| $MgCl_2$ | 9.8 |
| NaCl | 2.9 |
| Water | 69.9 |

Trace amounts of other alkali metal and alkaline earth halogenated salts included.

The reaction was carried out at a temperature of about 63° C. for about 5.6 hours, and at a soluble alkalinity level of 5–6 mls. Soluble alkalinity means the number of mls. of 0.1 N HCl necessary to neutralize 100 mls. of precipitator slurry filtrate to a phenolphthalein end point. Magnesium hydroxide precipitate containing MgO was thereby formed dispersed in an aqueous mother liquor containing about 20 percent $CaCl_2$, and from which the aforesaid initial sample was taken for purposes of the following tests:

A first portion (A) of the initial slurry sample was further divided in 5 subportions 1 through 5, each subportion being further divided into two parts (a) and (b). Part (a) represents the control or prior art process (not in accordance with the invention), whereas, part (b) is illustrative of the invention.

Part (a) of each said subportion of precipitator slurry was filtered and the solids washed with water to reduce the chloride content to the level indicated in Table I below. The solids were then reslurried and repulped to a 50 percent solids level in water then one sample heated to a temperature of 100° C. for 2½ days, one at 80° C. for 3½ days, one at 65° C. for 6½ days, one at 45° C. for 7½ days, and one at 25° C. for 15½ days, for the purpose of water slaking all the MgO to $Mg(OH)_2$. It should be noted that the slaking times were in excess of those actually required and taught by the present invention to insure complete slaking in all cases in order that correct surface area determinations of the $Mg(OH)_2$ could be taken. Accordingly, the slaking times were extended to those times indicated.

Part (b) of each subportion of the precipitator slurry was also heated to the above temperatures for the above times, but without first filtering, for the purpose of treating the MgO to $Mg(OH)_2$ in the presence of the $CaCl_2$ mother liquor in accordance with the present invention. After such treatment the solids were recovered by filtration, similarly washed as in part (a), and then reslurried in water to a 50 percent solids level.

Each sample part (a) and (b) of subportions 1 through 5 after the above treatment were filtered, washed with water, and the filter cake dried at 130° C. overnight. A representative prepared (sample) portion of each cake was tested by a nitrogen adsorption method for surface area in square meters per gram and for apparent density in grams per cubic centimeter by the method described below:

Sample preparation. The dry sample was screened through a 28 mesh sieve. About 15 g. of each sample was pelleted at 15,000 p.s.i.g. using a commercially available laboratory press with a 1.125 inch diameter die.

Firing.—The samples were fired in a gas fired zirconia furnace along with standards in the following manner: 25 to 500° C. in 1 hour; 500 to 800° C. in 2 hours; 800 to 1000° C. in 1/2 hour: 1000 to 1,700° C. in 2 hours, hold at 1,700° C. for 1 hour, cool overnight.

Pellet evaluation.—The pellets were crushed through a number 10 mesh screen and caught on a number 16 mesh screen. Apparent density was determined by a mercury porosimeter analytical method, modified to measure the volume of pores of less than 17.5 microns in diameter.

The results of these tests are categorized and presented in Table I below:

TABLE I.—INITIAL PRECIPITATOR SLURRY

| | 1 | | 2 | | 3 | | 4 | | 5 | |
|---|---|---|---|---|---|---|---|---|---|---|
| | 2½ days at 100° C. | | 3½ days at 80° C. | | 6½ days at 65° C. | | 7½ days at 45° C. | | 15½ days at 25° C. | |
| | Subportion parts | | | | | | | | | |
| | a | b | a | b | a | b | a | b | a | b |
| Chlorides on 50% $Mg(OH)_2$ solids basis | 0.14 | 0.13 | 0.14 | 0.12 | 0.14 | 0.11 | 0.14 | 0.12 | 0.14 | 0.11 |
| Periclase apparent density of calcined $Mg(OH)_2$ gm./cc. (MgO dried cake) | 3.17 | 3.22 | 3.16 | 3.22 | 3.15 | 3.21 | 3.17 | 3.23 | 3.19 | 3.22 |
| Surface area in sq. meters per gram $Mg(OH)_2$ (double washed and dried) | 7.9 | 13.1 | 7.2 | 13.0 | 8.2 | 13.5 | 9.0 | 15.1 | 10.2 | 14.6 |

It can be seen from the data in Table I for each of subportions 1 through 5 when comparing the data for (a) and (b) for each said subportion that the apparent density of the $CaCl_2$ treated MgO in (b) as opposed to that of the water treated MgO in (a) is substantially greater in all cases. Moreover, the surface area of the $CaCl_2$ slaked MgO ($Mg(OH)_2$) is significantly greater in every case.

Accordingly, treating the precipitator solids in accordance with the present invention produces a magnesium hydroxide having a high surface area, and a resulting magnesium oxide product characterized by a higher than ordinary apparent density when compared to the densities obtained from the prior art processes and control of this example.

EXAMPLE II

To show that the novel slaking method of the present invention makes possible a dewaterable and repulpable magnesium hydroxide slurry having a significantly greater solids level, the filtering data for the subportions and parts of subportions in Example I is presented in Table II below. The 50 percent magnesium hydroxide slurries in parts (a) and (b) above were dewatered by a series of as many repetitive filtration and repulping steps as possible. Table II below indicates the number of filtrations possible for each part (a) and (b), and the $Mg(OH)_2$ solids content in percent by weight derived from each. On the average the $CaCl_2$ slaked material may be dewatered to a 4 percent higher $Mg(OH)_2$ solids content than the water slaked material. Moreover, Table II provides data which show that the $CaCl_2$ treated material is pumpable at a higher percent $Mg(OH)_2$ solids level than the material slaked in water. The concentration at which each slurry became pumpable was estimated by diluting each of the final filter cakes to various concentrations with water and establishing the shear stress in pounds per square feet obtained at a shear rate of 100 sec.$^{-1}$ with a Haake Rotovisco Viscometer. A plot of the shear stress values versus percent $Mg(OH)_2$ solids permits estimating the solids content at which the shearing stress is equal to 1.5 lbs./ft.$^2$. Past experience has shown that at 1.5 lbs./ft.$^2$ and lower values the slurries are readily pumpable.

required and taught by the present invention to insure complete slaking in all cases in order that correct surface area determinations of the $Mg(OH)_2$ could be taken.

The effect of $CaCl_2$ concentration and treatment temperature on the surface area in square meters per gram (M.$^2$/gm.) of the resulting $Mg(OH)_2$ solids is shown in Table III below:

TABLE III.—EFFECT OF $CaCl_2$ CONCENTRATION AND TREATMENT TEMPERATURE ON THE SURFACE AREA (m.$^2$/gm.) OF THE RESULTING $Mg(OH)_2$ SOLIDS

|  | 0%, $CaCl_2$ | 0.5%, $CaCl_2$ | 1%, $CaCl_2$ | 2%, $CaCl_2$ | 5%, $CaCl_2$ | 10%, $CaCl_2$ | 20%, $CaCl_2$ | 30%, $CaCl_2$ |
|---|---|---|---|---|---|---|---|---|
| At 100° C. for 1 day | 10.5 | 11.3 | 12.5 | 12.8 | 13.2 | 13.4 | 14.5 | 15.2 |
| At 80° C. for 2 days | 11.2 | 12.0 | 12.4 | 13.1 | 13.7 | 13.9 | 15.4 | 15.6 |
| At 65° C. for 5 days | 12.9 | 14.1 | 14.0 | 14.6 | 14.8 | 15.7 | 16.5 | 16.5 |
| At 45° C. for 7 days | 12.8 | 14.2 | 13.7 | 15.4 | 14.8 | 16.7 | 16.5 | 15.0 |
| At 25° C. for 12 days | 14.0 | 14.0 | 14.0 | 14.7 | 14.5 | 15.0 | 14.8 | 14.7 |

The extended time required to prepare the forty samples permitted a larger than normal quantity of the MgO to slake in the presence of the concentrated $CaCl_2$ mother liquor. This condition reduced the spread in surface areas somewhat; however, by simple inspection of the table it is apparent that the higher surface areas are obtained at 25, 45, 65, and 80° C. The preferred treatment temperature is 45 to 80° C., since at lower temperatures the rate of MgO slaking is lower. This data shows it to be apparent that concentrations above about 1 to 2% $CaCl_2$ promote the higher surfaces, with 10–30% $CaCl_2$ being the preferred range.

EXAMPLE IV

To illustrate the minimum time requirement under the invention to treat (age) MgO precipitator solids in calcium chloride, as compared to the minimum time required in water, and to show the differences in surface

TABLE II

|  | 1 | | 2 | | 3 | | 4 | | 5 | |
|---|---|---|---|---|---|---|---|---|---|---|
|  | 2½ days at 100° C. | | 3½ days at 80° C. | | 6½ days at 65° C. | | 7½ days at 45° C. | | 15½ days at 25° C. | |
|  | \multicolumn{10}{c}{Subportion parts} | | | | | | | | | |
|  | a | b | a | b | a | b | a | b | a | b |
| Filtration data of 50% adjusted slurry: | | | | | | | | | | |
| Percent $Mg(OH)_2$ solids in first cake | 60.8 | 63.3 | 61.6 | 63.3 | 61.2 | 63.4 | 60.3 | 62.6 | 59.8 | 62.0 |
| Percent $Mg(OH)_2$ solids in second cake | 67.9 | 68.8 | 68.9 | 70.4 | 68.4 | 71.0 | 68.0 | 70.3 | 67.3 | 68.8 |
| Percent $Mg(OH)_2$ solids in third cake | (¹) | 74.6 | (¹) | 75.9 | (¹) | (¹) | (¹) | (¹) | (¹) | (¹) |
| Rheology of Repulped Material, percent $Mg(OH)_2$ solids level at which slurry becomes pumpable | 59.5 | 64.5 | 59.5 | 66.6 | 58.0 | 65.4 | 59.2 | 63.5 | 60.6 | 64.3 |
| Point where shear stress falls to 1.5 lbs./ft.² at a shear rate of 100 sec.⁻¹. | | | | | | | | | | |

¹ No longer filterable.

It can readily be seen from Table II that in each case the $CaCl_2$ treated material produced a more concentrated pumpable slurry product than did the water treated material. As calculated from this data the pumpable slurries by the method of the present invention averaged a 5½ percent higher solids content. This is highly significant since for each percentage point less water in the slurry, a greater economical shipping cost advantage is realized.

EXAMPLE III

To illustrate the effect of varying $CaCl_2$ concentrations in the treating liquid of the present invention, a number of artificial mother liquors were prepared in which to treat the MgO containing precipitator solids.

The initial precipitator slurry sample obtained conventionally as in Example I was filtered and the solids washed essentially free of $CaCl_2$. The wet filter cakes were then transferred into various strengths of $CaCl_2$ solutions to yield a final soluble concentration of 0, 0.5, 1, 2, 5, 10, 20, and 30 percent $CaCl_2$. Each of the resulting slurries were then subdivided into five equal portions for treating at temperatures of 100°, 80°, 65°, 45°, and 25° C. for periods of 1, 2, 5, 7, and 12 days respectively. Again the slaking times were greatly in excess of those actually area of the solids, and in addition to illustrate that such difference is relatable to the treatment of the MgO, a fresh sample of precipitator slurry was split into equal portions. The first portion was filtered and the resulting cake washed essentially free of the 20% $CaCl_2$ mother liquor with water. The washed filter cake solids were reslurried or re-suspended in a small quantity of water, and concurrently with the second portion of the precipitator slurry (but separately) placed in a 100° C. water bath. Small samples were withdrawn after 0, 15, 30, and 60 minutes; 2, 3, 4, 6, 8½, and 22 hours, and after 2, 3, and 6 days, respectively. These individual samples were filtered, the cake washed with water, rinsed with alcohol to prevent further hydration of residual MgO, and the final cake dried at a temperature of 120° C. Each of the dried filter cakes was subjected to surface area and percent ignition loss measurements. The latter analysis consists of calcining the dried solids to 1000° C. in a muffle furnace. The weight loss reflects completeness of MgO hydration in the precipitator solids. Typically, the value will increase until all of the MgO has slaked (hydrated) and then level off.

The test results are presented in both tabular form below, and in graphic form in the appended drawing.

TABLE IV

| | Precipitator Solids | | | |
|---|---|---|---|---|
| | 1st Portion (In H$_2$O) | | 2nd Portion (In 20% CaCl$_2$) | |
| Contact Time | Percent Ignition Loss | Surface Area, m.$^2$/gm. | Percent Ignition Loss | Surface Area, m.$^2$/gm. |
| Initial | 21.9 | 18.8 | 21.4 | 20.5 |
| 15 minutes | 22.7 | 15.8 | 22.8 | 21.3 |
| 30 minutes | 24.0 | 14.1 | 24.3 | 18.9 |
| 1 hour | 25.9 | 13.1 | 26.9 | 17.1 |
| 2 hours | 27.7 | 10.9 | 28.3 | 15.8 |
| 3 hours | 28.4 | 10.6 | 29.4 | 16.0 |
| 4 hours | 28.9 | 10.5 | 29.9 | 15.1 |
| 6 hours | 29.4 | 9.9 | 30.3 | 15.0 |
| 8½ hours | 29.7 | 10.1 | 30.5 | 14.4 |
| 22 hours | 30.3 | 9.7 | 30.7 | 14.7 |
| 2 days | 30.6 | 9.1 | 30.8 | 14.6 |
| 3 days | 30.6 | 8.9 | 30.6 | 15.0 |
| 6 days | 30.7 | 8.9 | 30.9 | 15.4 |

Figure 2:
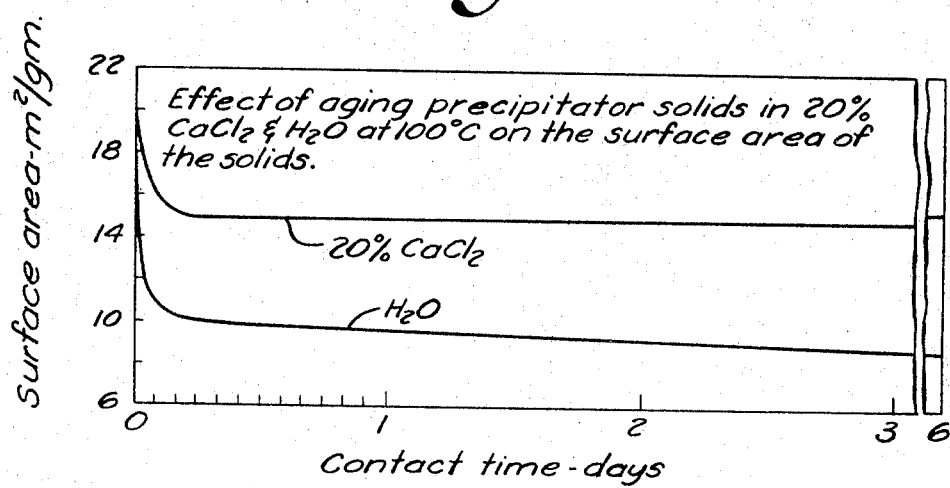

The drawing portrays this data graphically, in FIGS. 1 and 2.

As is clear from the data in Example IV, hydration of the MgO precipitator solids is essentially complete in 4 to 8 hours of contact time at 100° C., and the final surface area of said solids is significantly greater in the CaCl$_2$ treating solution than in water and is substantially constant after about 4–8 hours of contact time.

The present invention may be modified or changed without departing from the spirit or scope thereof, and it is understood that the invention is only limited as defined in the appended claims.

We claim:
1. In a method of preparing magnesium hydroxide from dolomite and a brine wherein (a) slaked dolime comprising calcium hydroxide and magnesium oxide is reacted with an aqueous magnesium halide-calcium chloride-containing brine, thereby obtaining an initial magnesium hydroxide precipitate, and an aqueous calcium chloride-containing mother liquor which also contains solid magnesium oxide from said dolime, (b) the magnesium hydroxide and magnesium oxide solids are separated from said mother liquor, (c) subsequently the magnesium oxide solids are water slaked to form additional magnesium hydroxide, and (d) all the magnesium hydroxide is separated from the slaking solution; the improvement which comprises substituting for steps (b), (c) and (d), after step (a) the following steps:
   (1) treating the magnesium hydroxide and magnesium oxide solids by extended contact with said mother liquor at a temperature of from about 25° C. to about 100° C. for a time of from about 4 to about 120 hours; such time and temperature being sufficient to convert substantially all the magnesium oxide to magnesium hydroxide; said treatment being essentially completed prior to any separation of said solids from said mother liquor; and
   (2) separating essentially all the magnesium hydroxide from the mother liquor.
2. The improvement of claim 1 wherein the treatment temperature is from about 45° to about 80° C.
3. The improvement of claim 1 wherein the mother liquor has a calcium chloride content of from about 10 to about 30 weight percent.

References Cited

UNITED STATES PATENTS

| | | | |
|---|---|---|---|
| 3,007,776 | 11/1961 | Periard | 23—201 |
| 3,080,215 | 3/1963 | Waldron et al. | 23—201 |
| 3,294,485 | 12/1966 | Mayer | 23—201 X |
| 3,301,633 | 1/1967 | Stowe et al. | 23—201 X |
| 3,366,451 | 1/1968 | Waldron et al. | 23—201 |

OSCAR R. VERTIZ, *Primary Examiner.*

G. T. OZAKI, *Assistant Examiner.*